US010235605B2

(12) United States Patent
Criminisi et al.

(10) Patent No.: US 10,235,605 B2
(45) Date of Patent: Mar. 19, 2019

(54) IMAGE LABELING USING GEODESIC FEATURES

(71) Applicant: Microsoft Technology Licensing, LLC, Redmond, WA (US)

(72) Inventors: Antonio Criminisi, Cambridge (GB); Peter Kontschieder, Graz (AT); Pushmeet Kohli, Cambridge (GB); Jamie Daniel Joseph Shotton, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 9 days.

(21) Appl. No.: 13/860,515

(22) Filed: Apr. 10, 2013

(65) Prior Publication Data

US 2014/0307956 A1 Oct. 16, 2014

(51) Int. Cl.
*G06K 9/68* (2006.01)
*G06K 9/62* (2006.01)
(Continued)

(52) U.S. Cl.
CPC ......... *G06K 9/627* (2013.01); *G06K 9/00536* (2013.01); *G06K 9/00718* (2013.01);
(Continued)

(58) Field of Classification Search
CPC ........... G06K 9/00523; G06K 9/00536; G06K 9/00624; G06K 9/00718; G06K 9/6217;
(Continued)

(56) References Cited

U.S. PATENT DOCUMENTS 7,756,342 B2 7/2010 Bachmann et al.
7,822,252 B2 * 10/2010 Bi et al. ................. 382/154
(Continued)

FOREIGN PATENT DOCUMENTS

CN 102693007 A 9/2012

OTHER PUBLICATIONS

Björn Fröhlich, Erik Rodner, and Joachim Denzler, "As Time Goes by—Anytime Semantic Segmenation with Iterative Context Forests", Springer-Verlag Berlin Heidelberg, Lecture Notes in Computer Science, Pattern Recognition, vol. 7476, 2012, pp. 1-10.*
(Continued)

*Primary Examiner* — Eric Rush

(57) ABSTRACT

Image labeling is described, for example, to recognize body organs in a medical image, to label body parts in a depth image of a game player, to label objects in a video of a scene. In various embodiments an automated classifier uses geodesic features of an image, and optionally other types of features, to semantically segment an image. For example, the geodesic features relate to a distance between image elements, the distance taking into account information about image content between the image elements. In some examples the automated classifier is an entangled random decision forest in which data accumulated at earlier tree levels is used to make decisions at later tree levels. In some examples the automated classifier has auto-context by comprising two or more random decision forests. In various examples parallel processing and look up procedures are used.

20 Claims, 11 Drawing Sheets

(51) Int. Cl.
*G06K 9/00* (2006.01)
*G06K 9/72* (2006.01)

(52) U.S. Cl.
CPC ......... *G06K 9/6215* (2013.01); *G06K 9/6217* (2013.01); *G06K 9/6219* (2013.01); *G06K 9/6267* (2013.01); *G06K 9/6281* (2013.01); *G06K 9/6282* (2013.01); *G06K 9/6292* (2013.01); *G06K 9/72* (2013.01); *G06K 2209/051* (2013.01)

(58) Field of Classification Search
CPC .. G06K 9/6255; G06K 9/6256; G06K 9/6267; G06K 9/6279; G06K 9/628; G06K 9/6281; G06K 9/6282; G06K 9/6288; G06K 9/6289; G06K 9/629; G06K 9/6292; G06K 9/72; G06K 9/726; G06K 9/6215; G06K 9/6219; G06K 9/627
USPC ....... 382/100, 155, 156, 158–160, 173, 180, 382/181, 190, 195, 224, 226–228
See application file for complete search history.

(56) References Cited

U.S. PATENT DOCUMENTS

| | | | |
|---|---|---|---|
| 7,840,059 B2 | 11/2010 | Criminisi et al. | |
| 8,111,923 B2* | 2/2012 | Csurka et al. | 382/190 |
| 8,144,949 B2* | 3/2012 | Simon | G06T 7/0012 382/173 |
| 8,351,654 B2 | 1/2013 | Criminisi et al. | |
| 2004/0017947 A1* | 1/2004 | Yang | 382/224 |
| 2008/0075361 A1* | 3/2008 | Winn et al. | 382/224 |
| 2010/0278384 A1 | 11/2010 | Fitzgibbon et al. | |
| 2011/0091073 A1* | 4/2011 | Iwasaki et al. | 382/103 |
| 2011/0145826 A1 | 6/2011 | Sharp et al. | |
| 2011/0188715 A1 | 8/2011 | Shotton et al. | |
| 2011/0206273 A1* | 8/2011 | Plagemann | G06K 9/6215 382/154 |
| 2011/0210915 A1* | 9/2011 | Shotton | G06K 9/00369 345/157 |
| 2011/0274352 A1* | 11/2011 | Blake et al. | 382/173 |
| 2011/0293180 A1* | 12/2011 | Criminisi et al. | 382/173 |
| 2012/0114240 A1* | 5/2012 | Yamada | G06T 7/11 382/173 |
| 2012/0219202 A1 | 8/2012 | Kohli et al. | |
| 2012/0239174 A1 | 9/2012 | Fitzgibbon et al. | |
| 2012/0321169 A1 | 12/2012 | Baloch et al. | |
| 2013/0346346 A1 | 12/2013 | Criminisi et al. | |

OTHER PUBLICATIONS

Jamie Shotton, Matthew Johnson, and Roberto Cipolla, "Semantic Texton Forests for Image Categorization and Segmenation", IEEE Conference on Computer Vision and Pattern Recognition, Jun. 2008, pp. 1-8.*

Albert Montillo, Jamie Shotton, John Winn, Juan Eugenio Iglesias, Dimitri Metaxas, and Antonio Criminisi, "Entangled Decision Forests and Their Application for Semantic Segmentation of CT images", Information Processing in Medical Imaging, Lecture Notes in Computer Science, vol. 6801, Jul. 2011, pp. 184-196.*

O. Bencharef, M. Fakir, B. Minaoui, and B. Bouikhalene, "Tifinagh Character Recognition Using Geodesic Distances, Decision Trees & Neural Networks", International Journal of Advanced Computer Science and Applications, Aug. 2011, pp. 51-55.*

Xin Geng, De-Chuan Zhan, and Zhi-Hua Zhou, "Supervised Nonlinear Dimensionality Reduction for Visualization and Classification", IEEE Transactions on Systems, Man, and Cybernetics, Part B: Cybernetics, vol. 35, Issue 6, Dec. 2005, pp. 1098-1107.*

Criminisi, et al., "Geodesic Forests for Image Editing", In Microsoft Technical Report—MSR-TR-2011-96, Aug. 11, 2011, 9 pages.

Schroff, Florian, "Semantic Image Segmentation and Web-Supervised Visual Learning", In Phd Thesis, University of Oxford, Apr. 5, 2013, 186 pages.

Nieuwenhuis, et al., "Space-Varying Color Distributions for Interactive Multiregion Segmentation: Discrete Versus Continuous Approaches", In Proceeding of 8th International Conference of Energy Minimization Method in Computer Vision and Pattern Recognition, Jul. 25, 2011, 14 pages.

Kalogerakis, et al., "Learning 3D Mesh Segmentation and Labeling", In Journal of ACM Transactions on Graphics, vol. 29, Issue 4, Jul. 2010, 12 pages.

Santner, et al., "Interactive Texture Segmentation using Random Forests and Total Variation", In Proceedings of British Machine Vision Conference, Sep. 7, 2009, 12 pages.

Price, et al., "Geodesic Graph Cut for Interactive Image Segmentation", In IEEE Conference on Computer Vision and Pattern Recognition, Jun. 13, 2010, 8 pages.

"Labeled Faces in the Wild Home", Mar. 21, 2013, http://vis-www.cs.umass.edu/lfw/ 6 pages.

"The PASCAL Visual Object Classes Homepage", Apr. 5, 2013, http://pascallin.ecs.soton.ac.uk/challenges/VOC/ 5 pages.

Amit, et al., "Shape Quantization and Recognition with Randomized Trees", Published on: Aug. 1996, http://citeseerx.ist.psu.edu/viewdoc/download;jsessionid= E2DD3002083E7F82ACBF91132C1EADDC?doi=10.1.1.102.5478 &rep=rep1&type=pdf 56 pages.

Breiman, Leo, "Random Forests", In Journal of Machine Learning, vol. 45, Issue 1, Oct. 1, 2001, 28 pages.

Brostow, et al., "Segmentation and Recognition using Structure from Motion Point Clouds", In Proceedings of the 10th European Conference on Computer Vision: Part I, Oct. 12, 2008, 14 pages.

Criminisi, et al., "GeoS: Geodesic Image Segmentation", In Proceedings of the 10th European Conference on Computer Vision, Oct. 12, 2008, 14 pages.

Criminisi, et al., "Geodesic Image and Video Editing", In Journal of ACM Transactions on Graphics, vol. 29, Issue 5, Oct. 2010, 15 pages.

Criminisi, et al., "Decision Forests: A Unified Framework for Classification, Regression, Density Estimation, Manifold Learning and Semi-Supervised Learning", In Journal of Foundations and Trends® in Computer Graphics and Vision, vol. 7, Issue 2-3, Feb. 2012, 150 pages.

Frohlich, et al., "As Time Goes by—Anytime Semantic Segmentation with Iterative Context Forests", In Proceedings of Pattern Recognition—Joint 34th DAGM and 36th OAGM Symposium, Aug. 28, 2012, 10 pages.

He, et al., "Multiscale Conditional Random Fields for Image Labeling", In Proceedings of the IEEE Computer Society Conference on Computer Vision and Pattern Recognition, vol. 2, Jun. 27, 2004, 8 pages.

Jancsary, et al., "Regression Tree Fields—An Efficient, Nonparametric Approach to Image Labeling Problems", In Proceedings of the IEEE Conference on Computer Vision and Pattern Recognition, Jun. 16, 2012, 8 pages.

Kolmogorov, Vladimir, "Convergent Tree-reweighted Message Passing for Energy Minimization", In Journal of IEEE Transactions on Pattern Analysis and Machine Intelligence, vol. 28, Issue 10, Oct. 2006, 16 pages.

Kontschieder, et al., "Structured Class-Labels in Random Forests for Semantic Image Labelling", In IEEE International Conference on Computer Vision, Nov. 6, 2011, 8 pages.

Lepetit, et al., "Keypoint Recognition Using Randomized Trees", In IEEE Transactions on Pattern Analysis and Machine Intelligence, vol. 28, Issue 9, Sep. 2006, 29 pages.

Montillo, et al., "Entangled Decision Forests and their Application for Semantic Segmentation of CT Images", In Proceedings of the 22nd International Conference on Information Processing in Medical Imaging, Jul. 3, 2011, 12 pages.

Munoz, et al., "Stacked Hierarchical Labeling", In Proceedings of the 11th European Conference on Computer Vision: Part VI, Sep. 5, 2010, 14 pages.

Nowozin, et al., "Decision Tree Fields", In IEEE International Conference on Computer Vision, Nov. 6, 2011, 8 pages.

(56) References Cited

OTHER PUBLICATIONS

Payet, et al., "Hough Forest Random Field for Object Recognition and Segmentation", In IEEE Transactions on Pattern Analysis and Machine Intelligence, Sep. 5, 2012, 14 pages.

Ross, et al., "Learning Message-Passing Inference Machines for Structured Prediction", In Proceedings of the IEEE Conference on Computer Vision and Pattern Recognition, Jun. 20, 2011, 8 pages.

Sharp, Toby, "Implementing Decision Trees and Forests on a GPU", In Proceedings of In the 10th European Conference on Computer Vision, Oct. 12, 2008, 14 pages.

Shotton, Jamie Daniel Joseph, "Contour and Texture for Visual Recognition of Object Categories", In PhD Thesis, University of Cambridge, Mar. 2007, 141 pages.

Shotton, et al., "Efficient Human Pose Estimation from Single Depth Images", In IEEE Transactions on Pattern Analysis and Machine Intelligence, Apr. 5, 2013, 21 pages.

Shotton, et al., "Semantic Texton Forests for Image Categorization and Segmentation", In IEEE Conference on Computer Vision and Pattern Recognition, Jun. 23, 2008, 8 pages.

Shotton, et al., "TextonBoost: Joint Appearance, Shape and Context Modeling for Multi-Class Object Recognition and Segmentation", In Proceedings of 9th European Conference on Computer Vision, May 7, 2006, 14 pages.

Shotton, et al., "TextonBoost for Image Understanding: Multi-Class Object Recognition and Segmentation by Jointly Modeling Texture, Layout, and Context", In International Journal of Computer Vision, Jan. 2009, 30 pages.

Tu, et al., "Auto-context and Its Application to High-level Vision Tasks and 3D Brain Image Segmentation", In IEEE Transactions on Pattern Analysis and Machine Intelligence, vol. 32, Issue 10, Oct. 2010, 14 pages.

Winn, et al., "The Layout Consistent Random Field for Recognizing and Segmenting Partially Occluded Objects", In IEEE Computer Society Conference on Computer Vision and Pattern Recognition, Jun. 17, 2006, 8 pages.

Wolpert, David H., "Stacked Generalization", In Journal of Neural Networks, vol. 5, Issue 2, Apr. 5, 2013, 57 pages.

Yang, et al., "Local Label Descriptor for Example based Semantic Image Labeling", In Proceedings of the 12th European Conference on Computer Vision, Oct. 7, 2012, 14 pages.

"International Preliminary Report on Patentability Issued in PCT Patent Application No. PCT/US2014/033241", dated Jul. 9, 2015, 11 Pages.

Omer, et al., "The Bottleneck Geodesic: Computing Pixel Affinity", In Proceedings of the IEEE Computer Society Conference on Computer Vision and Pattern Recognition, vol. 2, Jun. 17, 2006, pp. 1901-1907.

"International Search Report & Written Opinion for PCT Patent Application No. PCT/US2014/033241", dated Jul. 15, 2014, Filed Date: Apr. 8, 2014, 11 Pages.

Kontschieder, et al., "GeoF: Geodesic Forests for Learning Coupled Predictors", In IEEE Conference on Computer Vision and Pattern Recognition, Jun. 23, 2013, pp. 65-72.

Geremia, et al., "Classification Forests for Semantic Segmentation of Brain Lesions in Multi-channel MRI", In Book—Decision Forests for Computer Vision and Medical Image Analysis, A Springer London Publication, Jan. 30, 2013, pp. 245-260.

O'Hara, et al., "Scalable Action Recognition with a Subspace Forest", In IEEE Conference on Computer Vision and Pattern Recognition, Jun. 16, 2012, pp. 1210-1217.

Chen, et al., "Supervised Geodesic Propagation for Semantic Label Transfer", In Book—Computer Vision—ECCV 2012, Lecture Notes in Computer Science, A Springer Berlin Heidelberg Publication, vol. 7574, Oct. 7, 2012, pp. 553-565.

"Office Action Issued in European Patent Application No. 14724259.8", dated Aug. 4, 2017, 5 Pages.

"First Office Action and Search Report Issued in Chinese Patent Application No. 201480020922.7", dated Feb. 5, 2018, 12 Pages.

"Second Office Action Issued in Chinese Patent Application No. 201480020922.7", dated Aug. 15, 2018, 8 Pages.

"Office Action Issued in European Patent Application No. 14724259.8", dated Aug. 29, 2018, 5 Pages.

"Third Office Action Issued in Chinese Patent Application No. 201480020922.7", dated Nov. 21, 2018, 8 Pages.

* cited by examiner

IMAGE LABELING USING GEODESIC FEATURES

BACKGROUND

Image labeling involves assigning labels to image elements according to whether they depict background or foreground objects or for other tasks. For example, semantic image segmentation is a process whereby an image is parsed into semantically meaningful regions. For example, a medical image may need to be analyzed to enable body organs to be recognized. In another example, a video of a street scene may need to be parsed into regions which depict vehicles, pedestrians, road, and other objects.

Many existing approaches to image labeling are limited in terms of the accuracy of the results produced and the time and resources needed. Often two or more separate stages of processing are needed in order to give reasonable levels of accuracy and this introduces complexity and time costs.

The embodiments described below are not limited to implementations which solve any or all of the disadvantages of known image labeling systems.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Image labeling is described, for example, to recognize body organs in a medical image, to label body parts in a depth image of a game player, to label objects in a video of a scene. In various embodiments an automated classifier uses geodesic features of an image, and optionally other types of features, to semantically segment an image. For example, the geodesic features relate to a distance between image elements, the distance taking into account information about image content between the image elements. In some examples the automated classifier is an entangled random decision forest in which data accumulated at earlier tree levels is used to make decisions at later tree levels. In some examples the automated classifier has auto-context by comprising two or more random decision forests. In various examples parallel processing and look up procedures are used.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a street scene image analysis system, the system described is provided as an example and not a limitation. As those skilled in the art will appreciate, the present examples are suitable for application in a variety of different types of image labeling systems.

Figure 1:
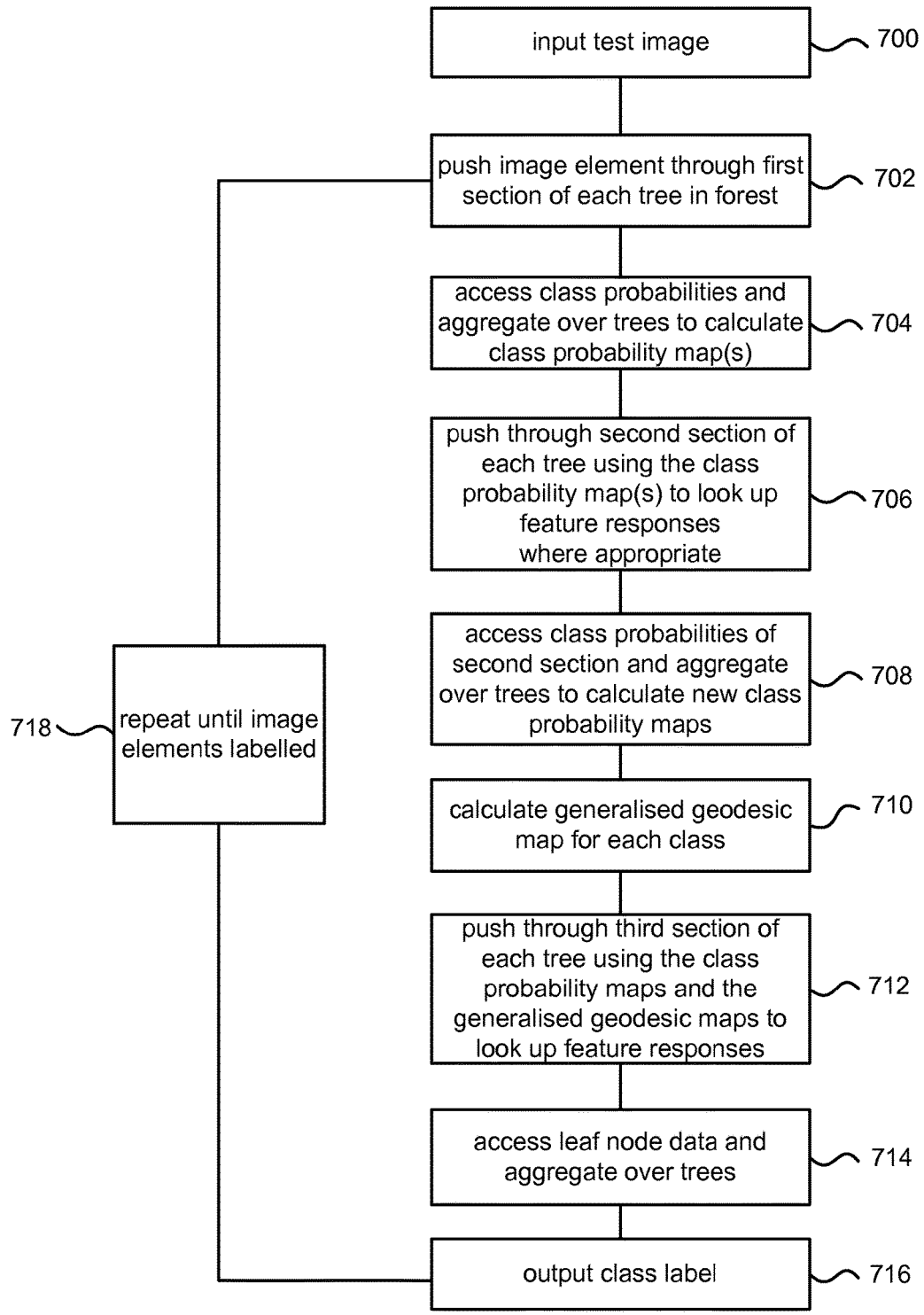
FIG. 1 is a schematic diagram of a image labeling engine using geodesic features.

FIG. 1 is a schematic diagram of a image labeling engine 102 which uses geodesic features. A geodesic feature describes a distance between image elements, the distance taking into account information about image content between the image elements. The geodesic features may be calculated with respect to a probabilistically defined image region and may be computed using edge maps, using a gradient of an image quantity such as intensity, color, texture, or other information about image content (including gradients of labeled image elements and/or probability values obtained from other image labeling systems). The geodesic features may be referred to as connectivity features as they describe how image elements at different locations in an image are connected via paths in the image. The paths may be shortest paths from an image element to a closest point in a probabilistically defined region of the image. The paths take into account gradients of an image quantity such as intensity. By using the geodesic features the image labeling engine 102 produces more accurate results than previously possible using conventional pairwise conditional random field systems or existing random decision forest classifiers. Parallel processing and look up procedures may be used to enable reduced operation time.

The image labeling system 102 receives an image 100 such as a digital photograph, a video, a medical image, a depth image or any other type of two dimensional, or higher dimensional image. In the example shown in FIG. 1 the image 100 depicts a scene comprising a house, a motor car and a tree. The image labeling engine 102 labels image elements of the image 100 as belonging to one of a plurality of possible classes, such as building, sky, ground, tree, motor vehicle, bicycle, person, to create an image with labeled image elements 104. In the case of medical images the classes may be body organs, or anomalies such as a tumor, for example.

FIG. 1 also shows another image labeling system 108 that uses geodesic features 108. This receives images 106 and outputs images with labeled image elements 110. An image element is a unit of an image such as a pixel, a voxel, a group of pixels or voxels. The image labeling system 108 may be integral with, or in communication with functionality 112 that uses the images with labeled image elements 110. For example, any of a medical image analysis system 114, a video conferencing system 116, an augmented reality system 118, a natural user interface system 120, a digital photograph editing system 122. The image labeling system 108 is computer implemented using software and/or hardware. The image labeling system may be at a desk top computer or a mobile communications device in the case of a digital photograph editing system or video conferencing system for example. The image labeling system may be implemented in a games console or other equipment. It may be provided as a service in some examples where digital images are sent to an image labeling engine in the cloud and the labeling results are sent to end user equipment.

Figure 2:
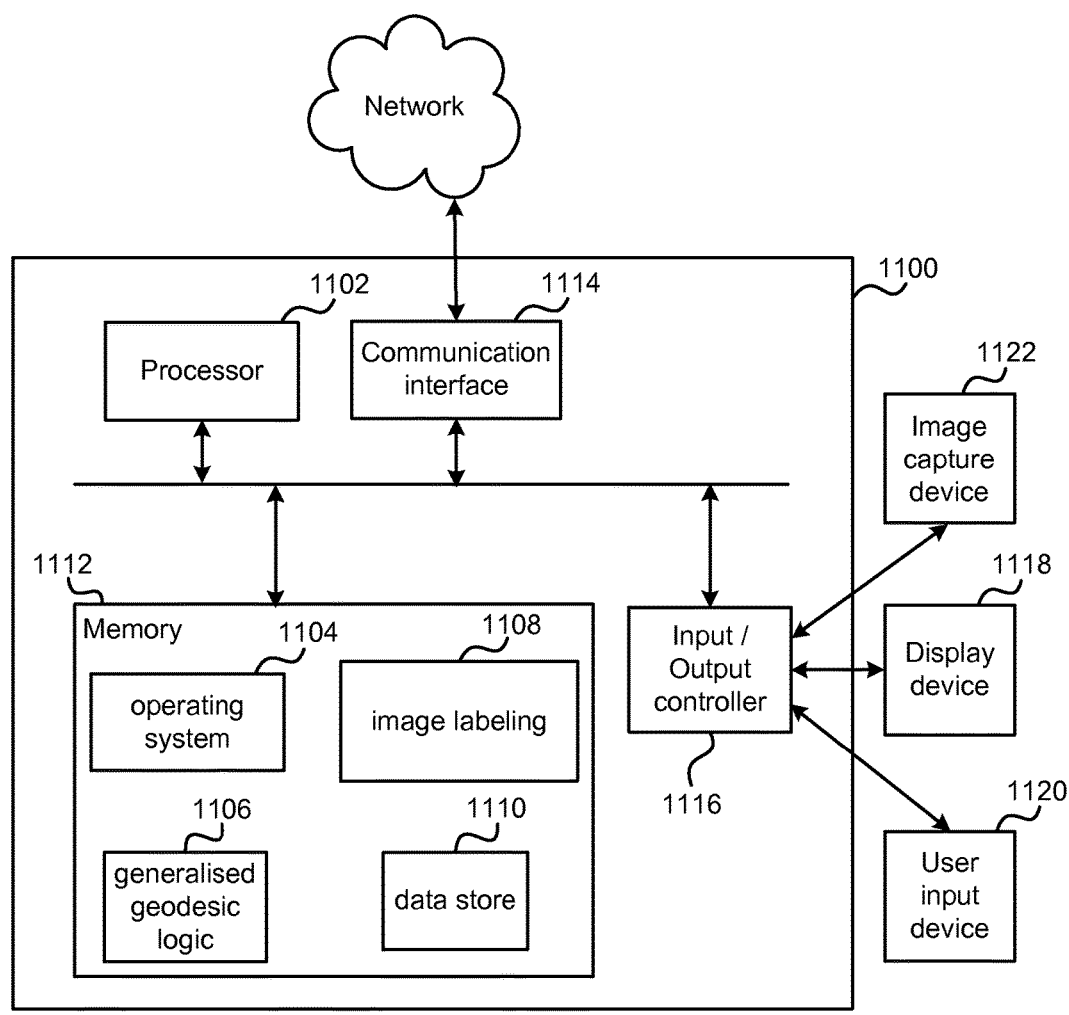
FIG. 2 is a schematic diagram of a medical image of a head and torso.

FIG. 2 is a schematic diagram of a medical image 200 of a head 202 and torso. This diagram may be used to illustrate how geodesic features may be useful for image labeling. The medical image depicts a torso with two lungs 204, 208 and part of the aorta 206. The medical image comprises image elements of different intensities according to the type of tissue, air or other material depicted. If two image elements 210, 212 in the aorta are inspected they are found to have similar intensities because they depict the same material. A standard classifier may classify these image elements as belonging to the same class based on the intensity values. If two image elements depicting air are inspected these may also be classified as belonging to the same class based on the intensity values which are similar. However, the two image elements may be in different objects such as the lung (image element 214) and the air around the outside of the body (image element 216). A standard classifier would give an erroneous classification in this case.

If a classifier is able to look at the image intensities of pixels in between the two end points then the classification results may be improved. This can be done, for example, by computing geodesic paths. A geodesic path between image elements 214 and 216 may be depicted as the solid line between those image elements in FIG. 2. This geodesic path may follow a route with the least change in intensity values (or another quantity). The geodesic path is longer than a straight line path (indicated by the dotted line between 214 and 216) in this example. The length of the geodesic path (or features related to this) may be used as a feature in the examples described herein to enable the image labeling to correctly identify image elements 214 and 216 as belonging to different entities. However, it is not straightforward to enable an automatic classifier to compute and use geodesic features in a practical manner that will operate at workable time scales.

Figure 3:
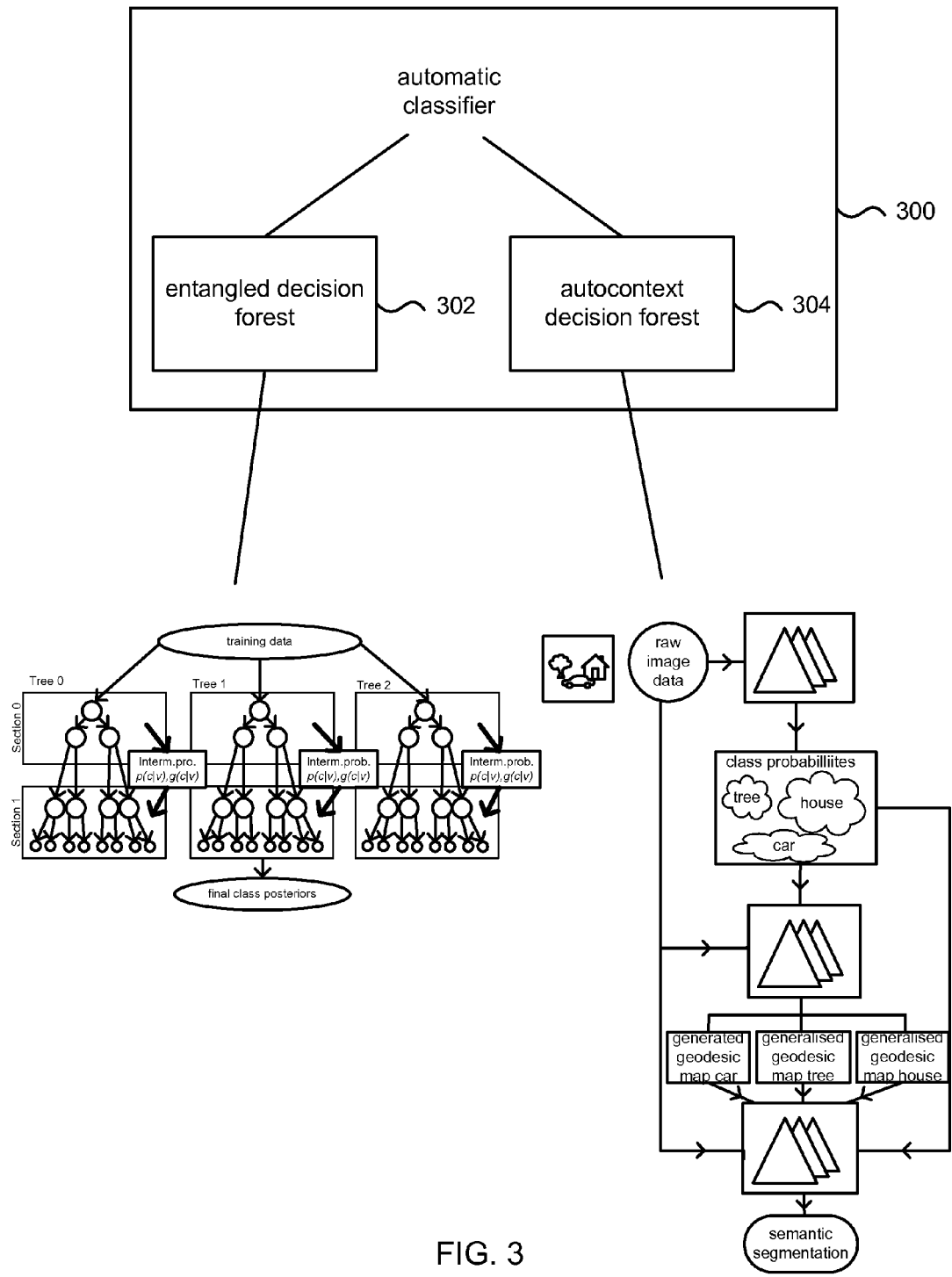
FIG. 3 is a schematic diagram of an automatic classifier.

FIG. 3 is a schematic diagram of an automatic classifier 300 which gives the functionality of the image labeling engine of FIG. 1. In various examples described in this document the automatic classifier comprises an entangled random decision forest 302. In other examples the automatic classifier comprises a plurality of random decision forests 304 with autocontext. It is also possible to use other types of automatic classifier 300 which use geodesic features such as support vector machine or boosting.

A random decision forest comprises one or more decision trees each having a root node, a plurality of split nodes and a plurality of leaf nodes. Image elements of an image may be pushed through trees of a decision forest from the root to a leaf node in a process whereby a decision is made at each split node. The decision is made according to characteristics of the image element and characteristics of test image elements displaced therefrom by spatial offsets specified by parameters at the split node. At a split node the image element proceeds to the next level of the tree down a branch chosen according to the results of the decision. During training, parameter values are learnt for use at the split nodes and data is accumulated at the leaf nodes. For example, distributions of labeled image elements are accumulated at the leaf nodes.

An entangled random decision forest is a random decision forest where at least one decision tree has split nodes at a specified level which accumulate data during training which is used to derive features for making decisions at at least one lower level of the tree. The derived features may be geodesic features in some examples as described below.

A plurality of random decision forests have autocontext where output from one random decision forest is available to enable decisions to be made at split nodes in at least one other random decision forest.

Figure 4:
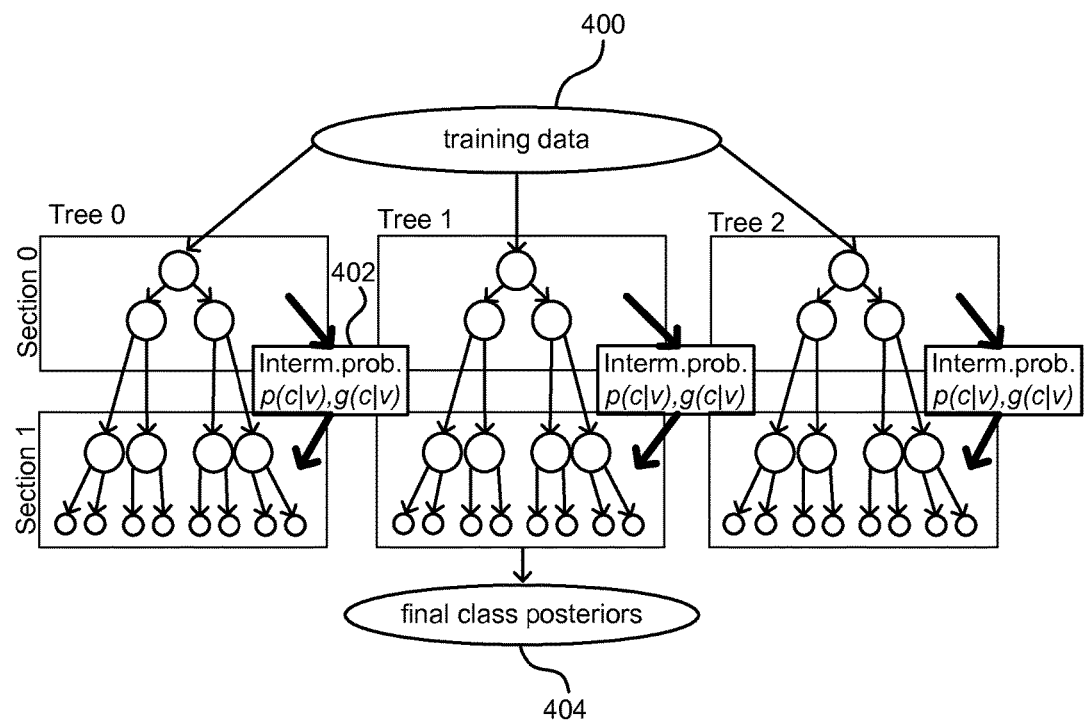
FIG. 4 is a schematic diagram of an entangled random decision forest.

FIG. 4 is a schematic diagram of an entangled random decision forest comprising three random decision trees: tree 0, tree 1, tree 2. In practice there may be more random decision trees in the forest. Each random decision tree comprises two (or more) sections: section 0 and section 1. A section comprises two or more layers of nodes. In this example each section has two layers of nodes although more layers may be used. During training, training data 400 may be used to train the trees in parallel. Once the training data reaches the lowest layer of section 0 it may be used to compute intermediate class probabilities and generalized geodesic distances. These derived features 402 may be used as input features to train section 1 of the trees in addition to the raw features 400. The training data reaching the leaf nodes of each tree is labeled and may be aggregated over the trees by class to give final class posterior probability distributions 404 which may be stored in a compact form. More detail about how an entangled random decision forest may be trained for image labeling and how it may be used at test time is given below with reference to FIGS. 5 to 7.

Figure 5:
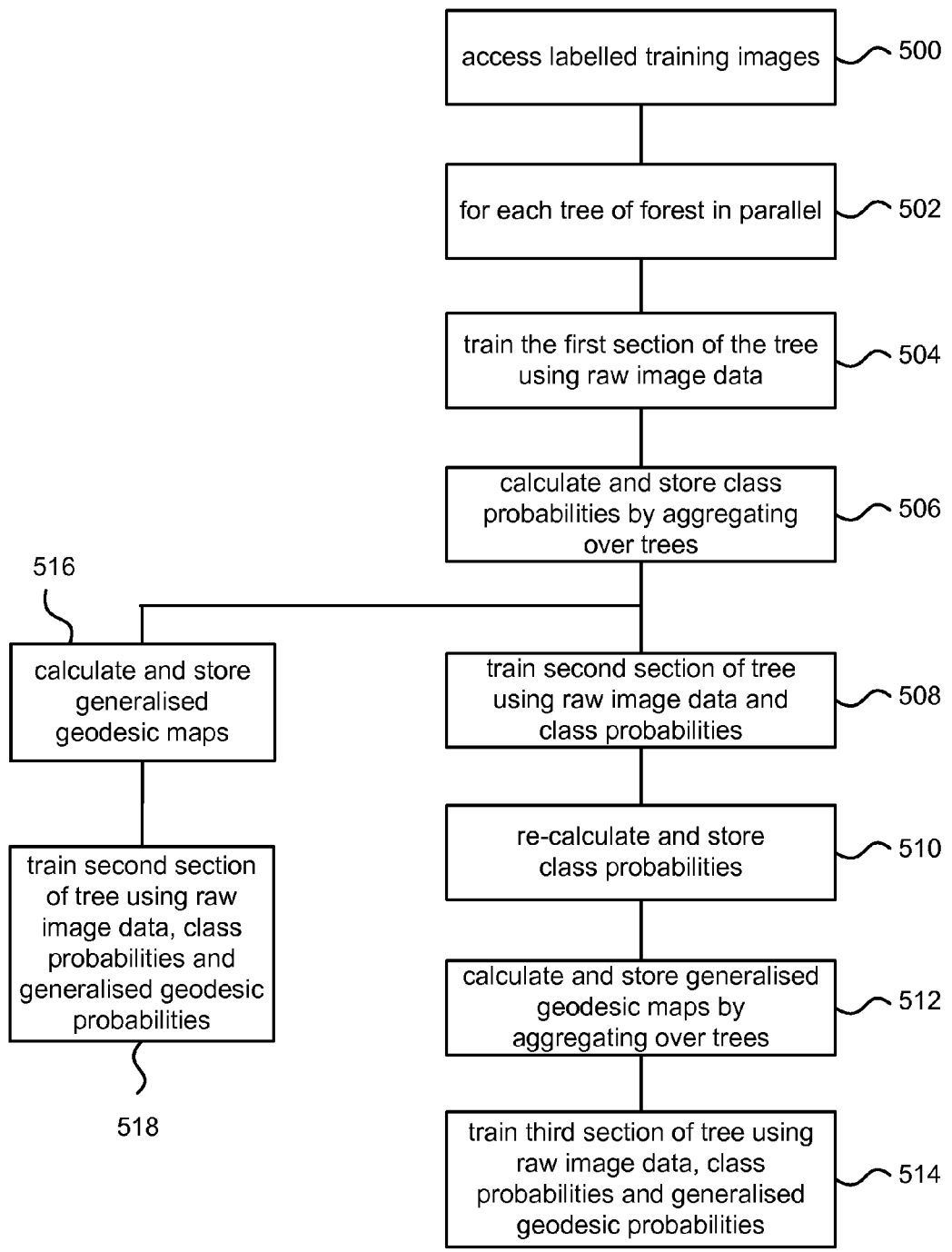
FIG. 5 is a flow diagram of a method of training an entangled random decision forest.

FIG. 5 is an example of a method of training an entangled random decision forest for the task of image labeling. Labeled training images are accessed 500. For example, these are medical images, in the case of a medical image application, where each image element is labeled with one of a plurality of possible classes. In the example of FIG. 1 the training images may be of street scenes and the possible classes may be house, tree, motor vehicle, background.

For each tree of the forest in parallel 502 the training procedure trains 504 the first section of each tree using raw image data such as intensity values or other values calculated locally at image elements. Once the first sections of each tree are trained, training data reaching the nodes at the lowest level of the first section of each tree is known. This training data is labeled and may be aggregated across the trees 506 by class to give class probabilities. The class probabilities may be referred to as intermediate class probabilities because they are computed at a level of the tree which is higher than the leaf nodes. The class probabilities may be stored in a compact manner.

The training procedure trains 508 the second sections of each tree in parallel using the raw image data and also using the intermediate class probabilities to make decisions at split nodes. Once the second sections are trained the training procedure recalculates 510 and stores the class probabilities. Because a lower level of each tree is now reached the intermediate class probabilities are more certain. The training procedure is able to use the intermediate class probabilities to calculate and store 512 generalized geodesic maps (one for each class). A generalized geodesic map comprises a numerical value at an image element location indicating a geodesic distance of that image element location from a probabilistically defined seed region. The seed region may be image elements likely to depict objects of a specified class. A third section of each tree may be trained 514 using the raw image data, the intermediate class probabilities and the generalized geodesic maps.

Given a grey-valued image J and a real-valued object "soft mask" (that encodes pixel likelihood) M(p): $\Omega \in \mathbb{N}^d \to [0,1]$ a generalized geodesic distance Q may be defined as follows:

$$Q(p; M, \nabla J) = \min_{p' \in \Omega}(\delta(p,p') + \nu M(p'))$$

The generalized geodesic maps may be computed using parallel processing as described in detail in US patent application US 2011/0145826 entitled "Parallel processing for distance transforms" which was published on 16 Jun. 2011. However, it is not essential to compute the generalized geodesic maps in this manner. Any method of calculating the generalized geodesic distances may be used.

Other numbers of sections may be used in the trees of the forest. For example, where two sections are used the training procedure at step 506 also computes 516 and stores the generalized geodesic maps. Second sections of the trees may then be trained 518 using the raw image data, the intermediate class probabilities and the generalized geodesic maps to make decisions at split nodes.

Figure 6:
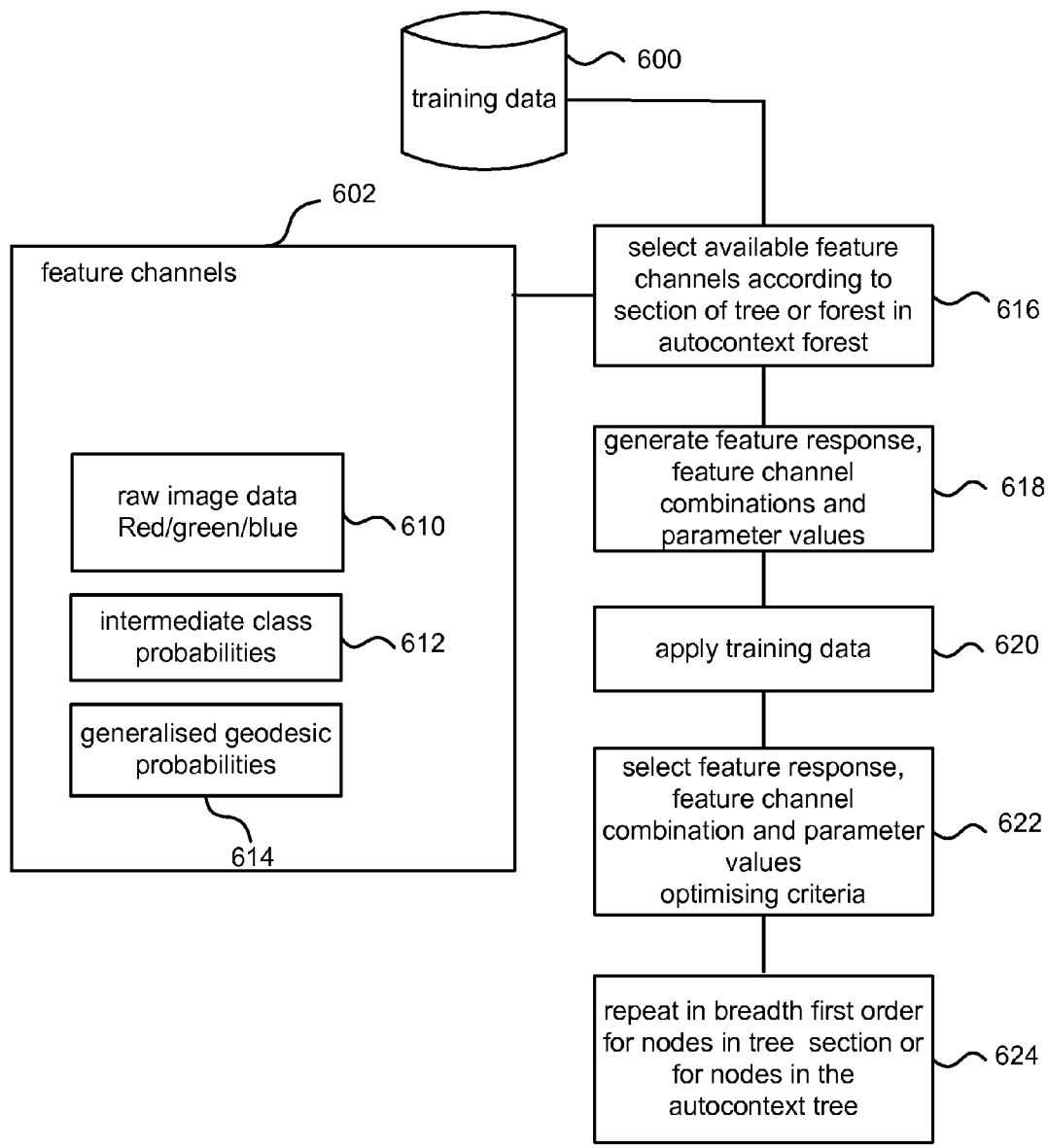
FIG. 6 is a flow diagram of more detail of part of the method of FIG. 5.

FIG. 6 is a flow diagram showing more detail of the training process of FIG. 5 during the steps 504, 508, 514, 518 when a specified section of the trees is trained. During those steps the tree sections are trained split node by split node in breadth first order. Training data 600 reaches a given split node from either the root node or an earlier split node and comprises image elements for which the class labels are known. The training process selects 616 available feature channels 602 according to which section of the tree is being trained. A feature channel is a type of feature (describing a characteristic of an image) computed using a specified image quantity. Examples of feature channels are now given although other types of feature channels may be used. In the case of RGB images, a feature channel may be raw image data 610 obtained from any one or more of R, G or B color channels of the raw images. A feature channel may comprise intermediate class probabilities 612 per class. A feature channel may comprise generalized geodesic maps 614 for example, computed from a greyscale intensity of a raw image. Available feature channels at a first section of a tree may be raw image data in any of the red, green and blue channels. At the second section of a tree the available feature channels may be as for the first section and in addition, intermediate class probabilities. At the third section of a tree the available feature channels may also include generalized geodesic maps for each possible class. Other examples of feature channels include but are not limited to, texture features, temporal derivatives in the case of videos. These are examples only and other combinations of feature channels may be available according to the tree sections.

The training process generates 618 (using a random sampling process or in other ways) combinations of feature responses, feature channels and parameter values. Examples of possible feature responses which may be used include differences between pairs of probe image element locations in the given feature channel, sums between pairs of probe image element locations in the given feature channel, and absolute differences between pairs of probe image element locations in the given feature channel. The probe image element locations are offset from a reference image element location according to at least some of the parameter values. It is not essential to use pairs of probe image elements; other numbers of probe image elements may be used including single probe image elements compared against the reference location. In the case that depth images are used the spatial offsets of the probe image elements from the reference image element are optionally made depth invariant by scaling by 1/depth of the reference image element.

The training process applies 620 the training data to the generated combinations of feature responses, feature channels and parameter values. Some of the parameters may be thresholds against which the feature responses are compared in order to decide which branch of the tree the training data will take. The training process selects 622 an optimal combination of the feature responses, feature channels and parameter values using optimizing criteria. The selected combination is stored for use at the split node during test time.

The training process repeats the process of FIG. 6 for the split nodes of the section of the tree being trained in breadth first order or any other suitable order 624.

The optimizing criteria may be a measure of information gain, a reduction in variance objective, or another training objective.

Once the entangled random decision forest has been trained it may be used to classify image elements of a previously unseen image (that is, an image not used during training also referred to as a test image). The test image is accessed 700 and image elements from the test image are pushed 702 through the first section of each tree in the forest to identify one node at the bottom level of the first section in each tree. The training data accumulated at the identified nodes during training is accessed and aggregated 704 over the trees to calculate a class probability map. This has, at each image element location, an intermediate probability value for each class, and optionally a geodesically smoothed version of that probability.

The test image elements are pushed 706 through the next section of each tree. The class probability map is used to look up feature responses where appropriate. The test image elements reach one node at the bottom level of the second section in each tree. The training data accumulated at the identified nodes during training is accessed and aggregated 708 over the trees to calculate an updated class probability map. Using this map to provide soft, probabilistic seed regions or masks, generalize geodesic maps are computed 710, one for each class.

The test image elements are pushed 712 through the third section of each tree using the class probability map and the generalized geodesic maps to look up feature responses. Eventually the test image elements reach one leaf node of each tree. The data associated with the identified leaf nodes is accessed and aggregated 714 over the trees and a class label is output 716. The process repeats or is computed in parallel 718 for other image elements of the test image until all the image elements are labeled.

By using look ups into the class probability and geodesic maps to compute the feature responses it is possible to speed up processing at test time.

Figure 7:
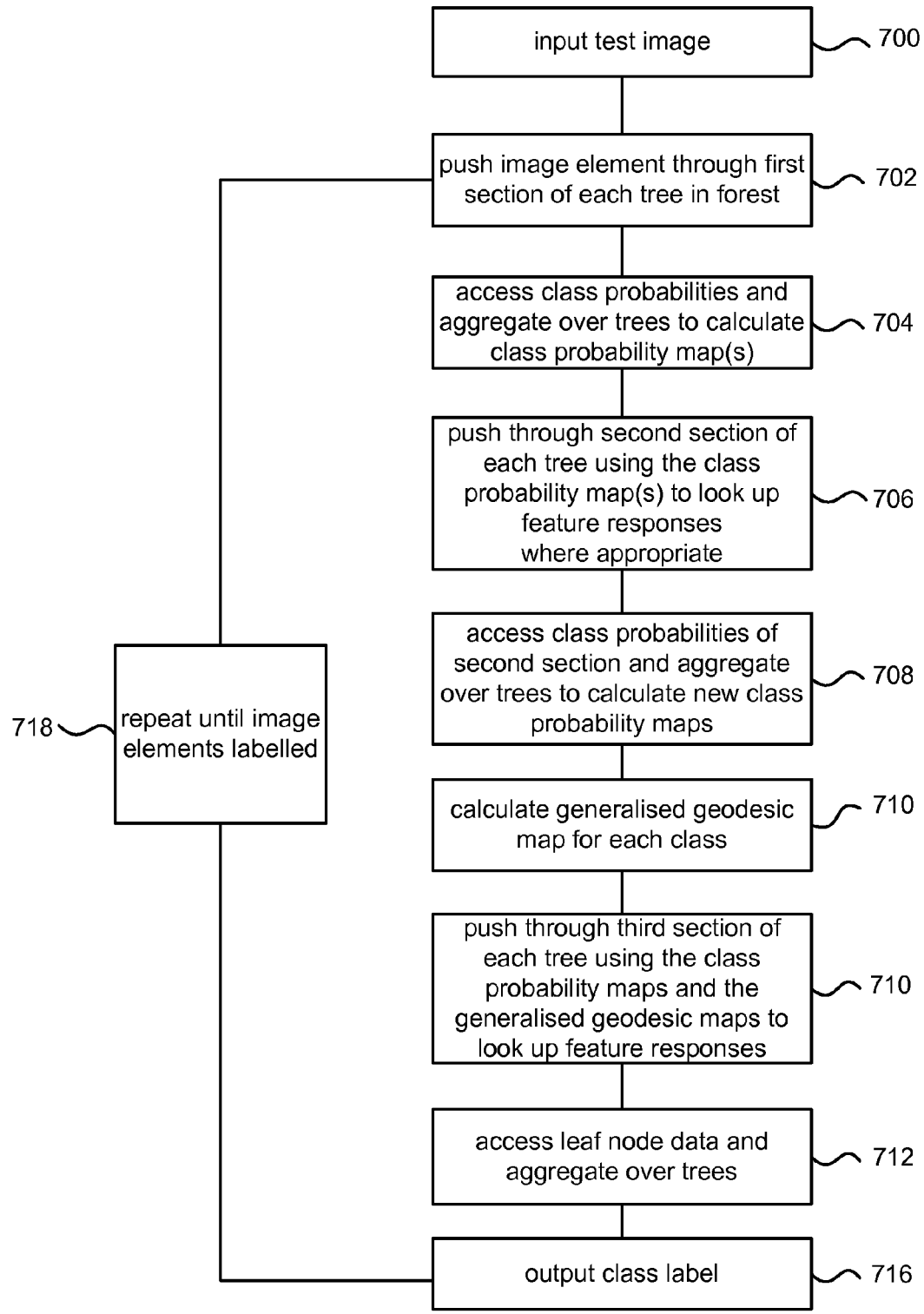
FIG. 7 is a flow diagram of a method of using a trained entangled random decision forest to semantically segment an image.

The example described with reference to FIGS. 6 and 7 is one possible arrangement. It is also possible to use other combinations and sequences of geodesic and non-geodesic sections in the random decision trees.

Figure 8:
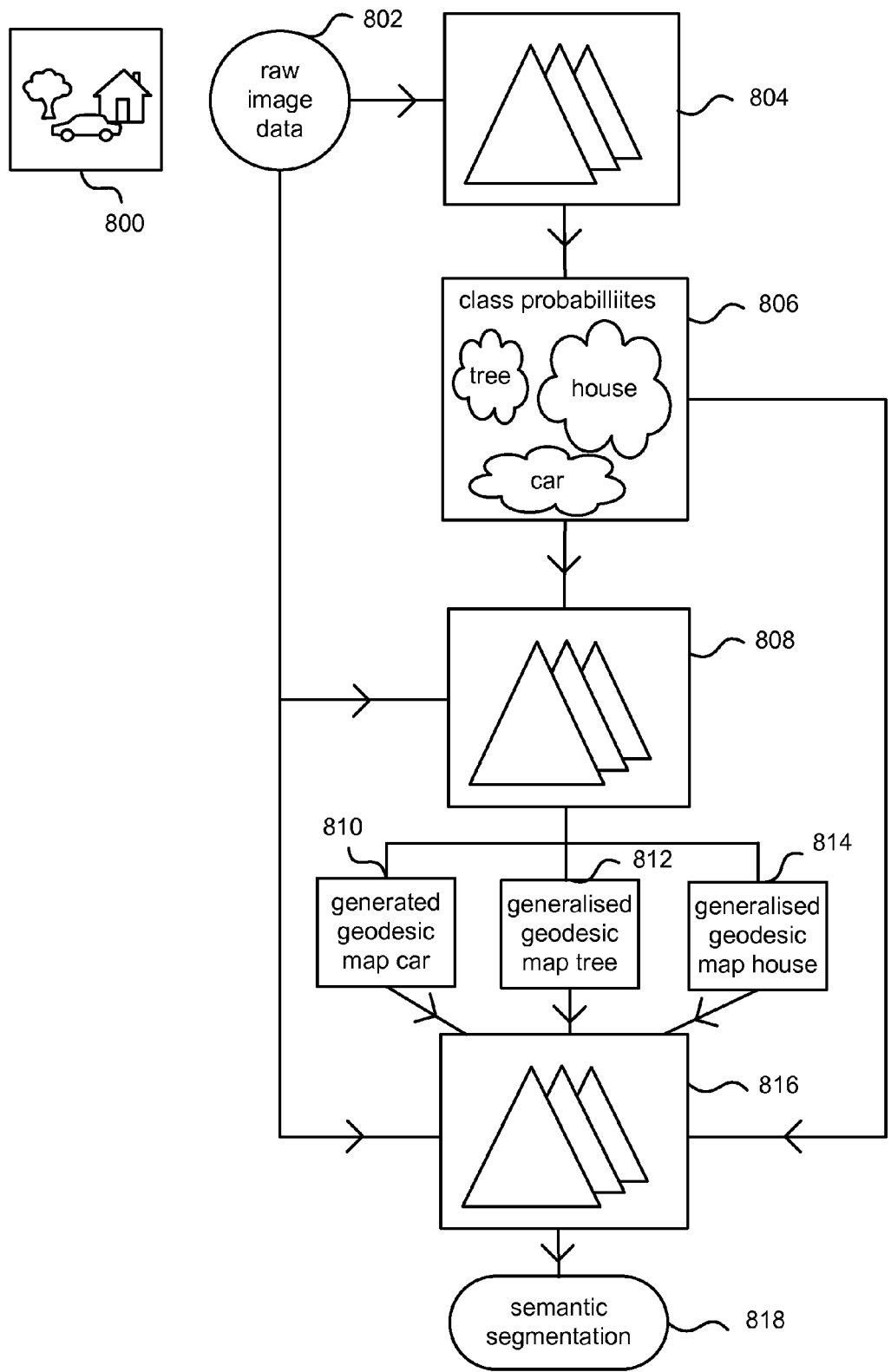
FIG. 8 is a schematic diagram of a plurality of random decision forests giving autocontext.

FIG. 8 is a schematic diagram of a plurality of random decision forests 804, 808 816 giving autocontext. Each random decision forest 804, 808, 816 comprises a plurality of random decision trees each indicated schematically as a triangle. In this example the random decision forests have already been trained (the training process is explained below with reference to FIG. 10) to classify images of street scenes such as those in the example of FIG. 1.

An image 800 such as the image of a tree, house and car (100 in FIG. 1) is input as a test image not previously seen by the random decision forests. Image elements from the image 800 are pushed through each tree of the forest. In this process raw image data 802 is used by the first random decision forest 804 to compute feature responses as described above. A leaf node is identified for each tree in the forest and the data accumulated at those leaf nodes during training accessed. The accessed data is aggregated across the forest to give class probabilities 806.

A second random decision forest 808 is able to use the class probabilities 806 and the raw image data 802 to when it computes feature responses. Image elements from the image 800 are passed through each tree in the forest 808. A leaf node is identified for each tree in the forest and the data accumulated at those leaf nodes during training accessed. The accessed data is aggregated across the forest to give updated class probabilities. The updated class probabilities are not shown separately in FIG. 8 but may be overwritten on class probabilities 806.

The class probabilities 806 are used to compute a generalized geodesic map for each class from the input image 800. In this example three generalized geodesic maps are shown one for the class car 810, one for the class tree 812 and one for the class house 814.

A third random decision forest 816 is able to use the class probabilities 806, the raw image data 802, and the generalized geodesic maps when it computes feature responses at the split nodes. Image elements from the image 800 are passed through each tree in the forest 816. A leaf node is identified for each tree and in the forest and the data accumulated at those leaf nodes during training accessed. The accessed data is aggregated across the forest to give updated class probabilities which are used to compute a class label for each image element of image 800 which results in semantic segmentation 818.

In the example of FIG. 8 three random decision forests are used. However, it is also possible to use more random decision forests.

Figure 9:
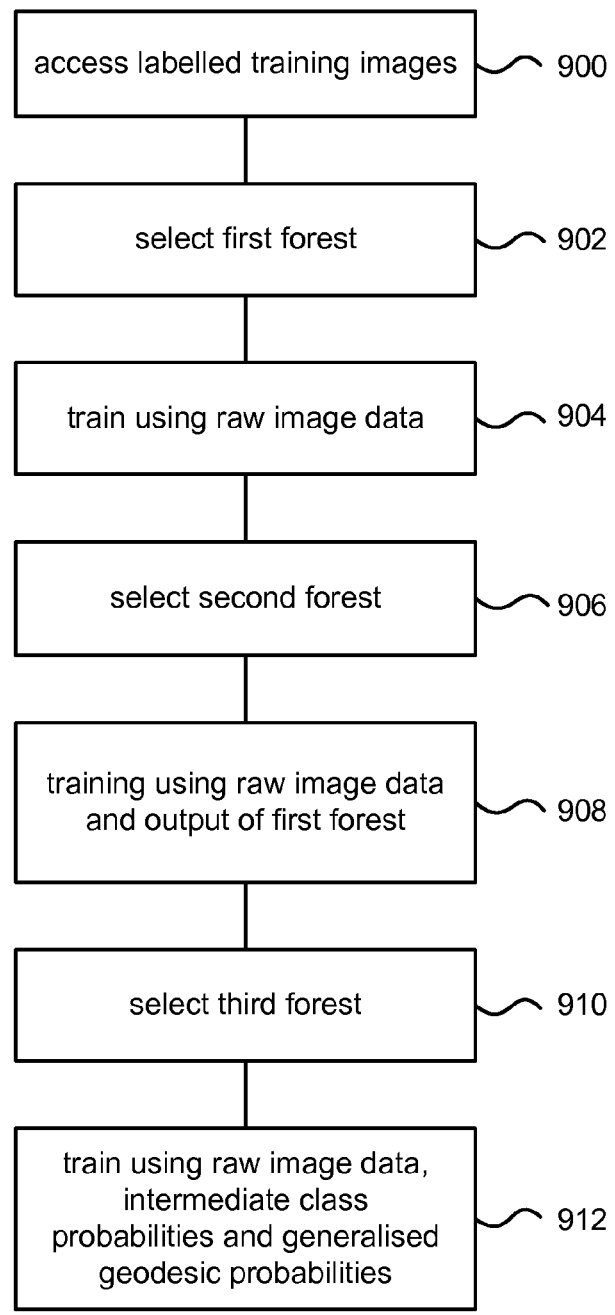
FIG. 9 is a flow diagram of a method of training the random decision forests of FIG. 8.

FIG. 9 is a flow diagram of a method of training a plurality of random decision forests to enable autocontext for semantic segmentation. Labeled training images are accessed 900. A first random decision forest is selected 902 and trained 904 using raw image data such as intensity values. A second random decision forest is selected 906 and trained 908 using the raw image data and the output of the first random decision forest. A third random decision forest is selected 910 and trained 912 using the raw image data, and using data derived from the outputs of the first and second random decision forests. The data derived from the outputs of the first and second random decision forests may be intermediate class probabilities and generalized geodesic maps as described above.

Figure 10:
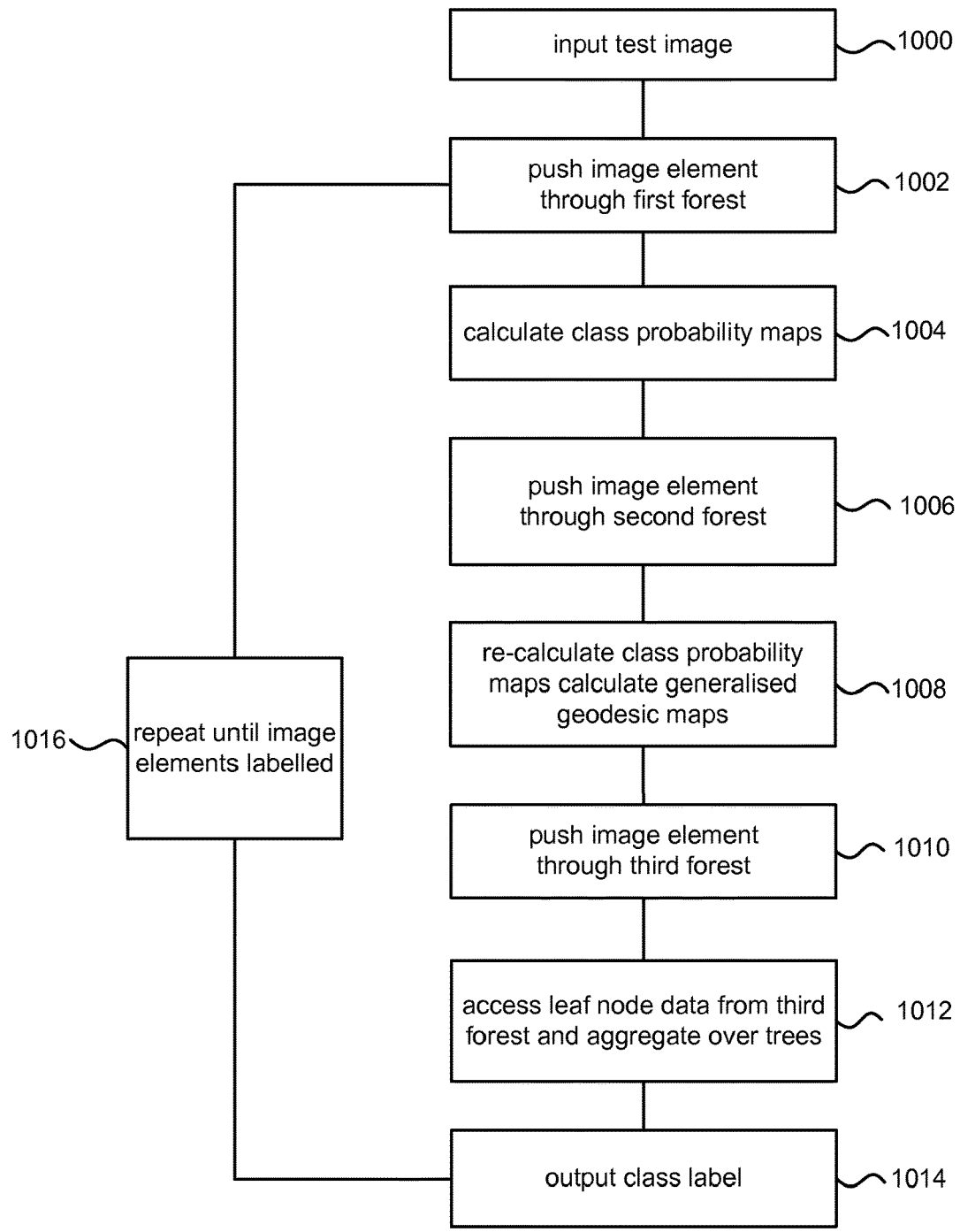
FIG. 10 is a flow diagram of a method of using the random decision forests of FIG. 8 (when trained) to semantically segment an image.

FIG. 10 is a flow diagram of a method of using a trained plurality of random decision forests which have autocontext. A test image is input 1000. Image elements from the test image are pushed 1002 through the first forest to identify one leaf node from each tree in the forest. Data stored at the identified leaf nodes is used to calculate 1004 class probability maps (one for each class or a single map combining all the classes). The image elements from the test image are pushed 1006 through the second forest. The data at the identified leaf nodes is used to recalculate the class probability maps. The class probability maps are used to calculate 1008 generalized geodesic maps as described above. The image elements from the test image are pushed 1010 through the third forest to identify a leaf node for each tree in the third forest. The leaf node data is accessed 1012 for the identified leaves and aggregated over trees to give class probabilities. The class probabilities are used to calculate a class label for the test image element(s) which is output 1014 and the process repeats 1016 until the image elements of the test image are labeled.

The examples described with reference to FIGS. 8 to 10 may be modified. It is also possible to use other numbers and arrangements of random decision forests where at least one forest uses geodesic features.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

Figure 11:
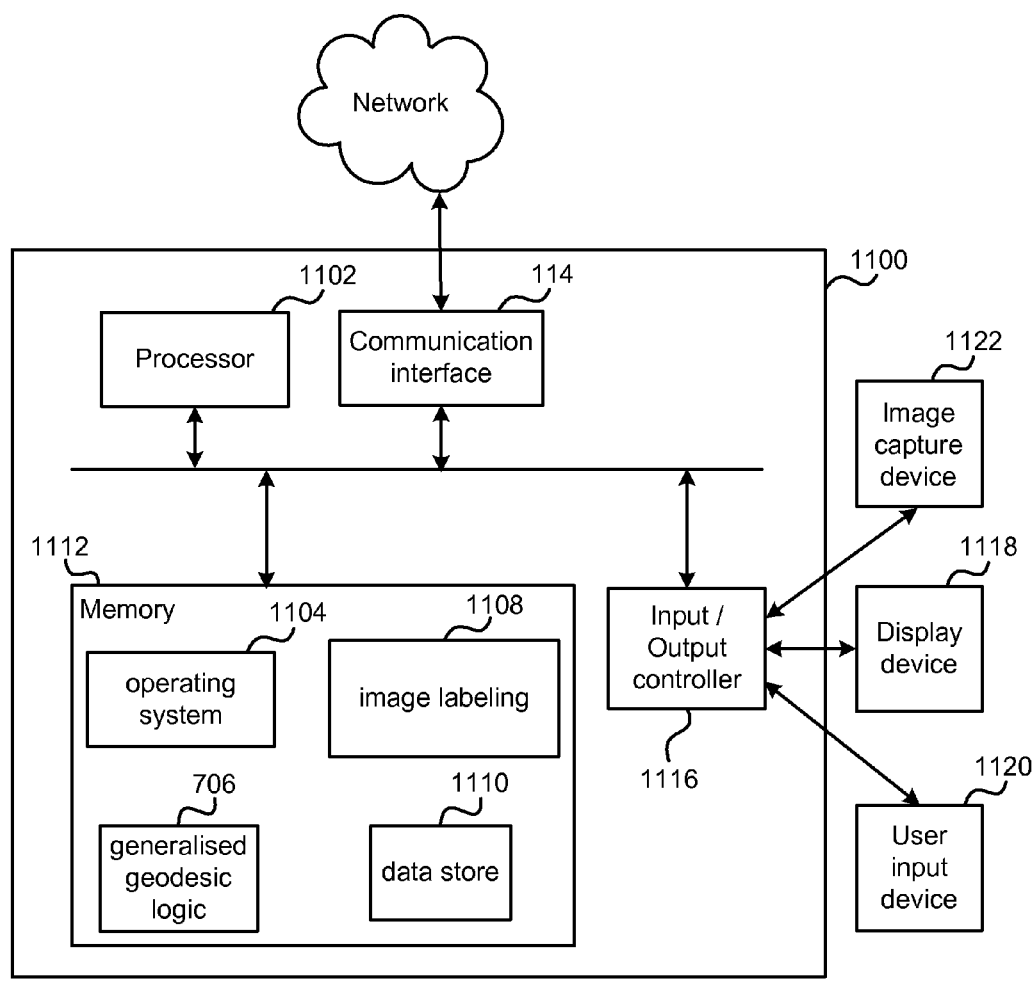
FIG. 11 illustrates an exemplary computing-based device in which embodiments of a image labeling engine may be implemented.

FIG. 11 illustrates various components of an exemplary computing-based device 1100 which may be implemented as any form of a computing and/or electronic device, and in which embodiments of image labeling may be implemented.

Computing-based device 1100 comprises one or more processors 1102 which may be microprocessors, controllers, graphics processing units or any other suitable type of processors for processing computer executable instructions to control the operation of the device in order to semantically segment images. In some examples, for example where a system on a chip architecture is used, the processors 1102 may include one or more fixed function blocks (also referred to as accelerators) which implement a part of the method of image labeling in hardware (rather than software or firmware). Platform software comprising an operating system 1104 or any other suitable platform software may be provided at the computing-based device to enable application software to be executed on the device. A image labeling engine 1108 implements at least part of the methods of any of FIGS. 5, 6, 7, 9, 10. A generalized geodesic logic 1106 is optionally provided to calculate generalized geodesic maps as described above. In some examples, the generalized geodesic logic 1106 is integral with the image labeling engine 1108. A data store 1110 stores trained random decision forests, training images, test images, labels, classes, training objectives, criteria and other data.

The computer executable instructions may be provided using any computer-readable media that is accessible by computing based device 1100. Computer-readable media may include, for example, computer storage media such as memory 1112 and communications media. Computer storage media, such as memory 1112, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 1112) is shown within the computing-based device 1100 it will be appreciated that the storage may be distributed or located remotely and accessed via a network or other communication link (e.g. using communication interface 1114).

The computing-based device 1100 also comprises an input/output controller 1116 arranged to output display information to a display device 1118 which may be separate from or integral to the computing-based device 1100. The display information may provide a graphical user interface. The input/output controller 1116 is also arranged to receive and process input from one or more devices, such as an image capture device 1122 or a user input device 1120 (e.g. a mouse, keyboard, camera, microphone or other sensor). In some examples the user input device 1120 may detect voice input, user gestures or other user actions and may provide a natural user interface (NUI). This user input may be used to specify classes, input test images, specify locations of training data, view labeled images, set criteria, or for other purposes. In an embodiment the display device 1118 may also act as the user input device 1120 if it is a touch sensitive display device. The input/output controller 1116 may also output data to devices other than the display device, e.g. a locally connected printing device.

Any of the input/output controller 1116, display device 1118 and the user input device 1120 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A computer-implemented method of semantically segmenting an image comprising:
   receiving an image at a processor;
   using an automatic classifier to classify image elements of the received image into a plurality of available classes, the automatic classifier using geodesic features computed from the received image, the geodesic features being features associated with a distance between the image elements, the distance being a generalized geodesic distance taking into account information about image content between the image elements to calculate a generalized geodesic map for one or more classes of the plurality of available classes, the geodesic features being computed from the received image using paths from an image element of the image elements to one or more probabilistically defined regions of the received image, the paths being geodesic paths that follow a route with least changes in intensity, color, texture or gradient of the plurality of image elements independent of a distance along the paths, the paths enabling identification of the image elements;
   wherein the automatic classifier comprises at least one random decision tree having a plurality of split nodes arranged to make decisions using the generalized geodesic map and the geodesic features;
   labeling the classified image elements as belonging to one of the available classes based on the identification using the paths; and
   generating an output image that is a semantically segmented image based on the labeling of the classified image elements in the received image.

2. A method as claimed in claim 1, wherein the paths are determined using only non-distance changes from the image elements to the one or more probabilistically defined regions and wherein the geodesic features comprise connectivity features that describe how the image elements at different locations in the received image are connected via the paths in the received image.

3. A method as claimed in claim 1 comprising using the automatic classifier to compute the one or more regions by computing, using raw data from the received image, probabilities of image elements of the received image belonging to the available classes and further comprising:
   using a first random decision forest to compute for each class of the plurality of available classes, the one or more probabilistically defined regions by computing class probabilities, using as the raw data from the received image, image elements of the received image;
   using a second random decision forest to compute for each class a respective generalized geodesic map using the geodesic features; and
   using a third random decision forest to classify the image elements of the received image into the plurality of available classes, the third random decision forest using (i) the respective geodesic maps for each class computed from the received image and (ii) the class probabilities.

4. A method as claimed in claim 1, wherein the paths take into account the gradient of a quantity of the received image and the paths are longer than a shortest straight line route from the image elements to the one or more probabilistically defined regions.

5. A method as claimed in claim 1, wherein the at least one random decision tree includes an entangled decision forest with trees having split nodes at a predefined level, the split nodes accumulating data during training, the data being used to derive features for making decisions at at least one lower level from the predefined level.

6. A method as claimed in claim 1, wherein the at least one random decision tree has a plurality of split nodes and wherein the automatic classifier is arranged to compute the geodesic features using data accumulated at at least one or more split nodes of the at least one random decision tree during training.

7. A method as claimed in claim 1, wherein the automatic classifier comprises an entangled random decision forest in which data accumulated at earlier tree levels during training is used to make decisions at later tree levels.

8. A method as claimed in claim 1 comprising training the automatic classifier using labeled training images and using geodesic features calculated from the labeled training images, wherein the paths are determined to a closest point in the probabilistically defined regions.

9. A method as claimed in claim 1, wherein the paths are geodesic paths that follow a route with least changes in intensity, color, texture, gradient of the plurality of image elements or probability values obtained from other image labeling systems, and wherein the available classes comprise classes of imaged objects that may be found in the received image.

10. A computer-implemented method of semantically segmenting an image comprising:
    receiving an image at a processor;
    using an automatic classifier to classify image elements of the received image into a plurality of available classes;
    the automatic classifier using geodesic features computed from the received image, the geodesic features being features associated with a distance between the image elements, the distance being a generalized geodesic distance taking into account information about image content between image elements to calculate generalized geodesic maps for one or more classes of the plurality of available classes and being independent of a distance of one or more of the image elements to one or more probabilistically defined regions of the received image;
    wherein the automatic classifier comprises at least one random decision tree having a plurality of split nodes arranged to make decisions using the generalized geodesic maps and the geodesic features and that enable identification of the image elements; and wherein the at least one random decision tree is trained at least in part by:

training a first section of the at least one random decision tree using raw image data, the raw image data comprising intensity values of image elements of the raw image data calculated locally;

labeling the trained first section and obtaining intermediate class probability data from the trained first section;

training a second section of the at least one random decision tree using the raw image data and the intermediate class probability data;

obtaining the generalized geodesic maps and updated class probability data based on the trained second section and the intermediate class probability data;

training a third section of the at least one random decision tree using the raw image data, the generalized geodesic maps, and the updated class probability data, and wherein the at least one trained random decision tree is used to label the image elements as belonging to one of the available classes and generate an output image that is a semantically segmented image based on the labeling of the image elements in the received image.

11. A method as claimed in claim 10, wherein the automatic classifier is arranged to compute the geodesic features using data accumulated at at least one or more split nodes of the plurality of split nodes during training.

12. A method as claimed in claim 10, wherein the process of training the at least one random decision tree generates combinations of feature responses, feature channels, and parameter values, the feature responses being at least one of differences, sums, or absolute differences between pairs of probe image element locations in the feature channel.

13. A method as claimed in claim 12, wherein look ups into class probabilities and the generalized geodesic maps are used to compute the feature responses.

14. A method as claimed in claim 10, wherein the at least one random decision tree includes an entangled decision forest.

15. An image segmentation engine comprising:

a processor arranged to receive an image;

the processor configured to acts as an automatic classifier that classifies image elements of the received image into a plurality of available classes using geodesic features computed from the received image, the geodesic features being features associated with a distance between the image elements, the distance being a generalized geodesic distance taking into account information about image content between the image elements to calculate generalized geodesic maps for one or more classes of the plurality of available classes, the geodesic features being computed from the received image using paths from an image element of the image elements to one or more probabilistically defined regions of the received image, the paths being geodesic paths that follow a route with least changes in intensity, color, or texture of the image elements independent of a distance along the paths, the paths enabling identification of the image elements, the automatic classifier comprising at least one random decision tree trained at least in part by:

training a first section of the at least one random decision tree using raw image data;

obtaining class probability data and the generalized geodesic maps from the first section of the at least one random decision tree;

training a second section of the at least one random decision tree using the raw image data, the generalized geodesic maps, and the class probability data, and the processor acting as the automatic classifier labeling the image elements as belonging to one of the available classes using the at least one trained random decision tree and generating an output image that is a semantically segmented image based on the labeling of the classified image elements in the received image.

16. An image segmentation engine as claimed in claim 15, wherein the at least one random decision tree comprises an entangled decision forest.

17. An image segmentation engine as claimed in claim 16, the processor configured to act as the automatic classifier being further configured to compute the one or more regions by computing, using raw data from the received image, probabilities of image elements of the received image belonging to the available classes.

18. An image segmentation engine as claimed in claim 16, wherein the paths take into account the gradient of a quantity of the received image.

19. An image segmentation engine as claimed in claim 15, wherein the at least one random decision tree comprises a plurality of split nodes arranged to make decisions using the geodesic features.

20. An image segmentation engine as claimed in claim 15, which is at least partially implemented using hardware logic selected from any one or more of: a field-programmable gate array, a program-specific integrated circuit, a program-specific standard product, a system-on-a-chip, a complex programmable logic device, a graphics processing unit.

* * * * *